United States Patent
Stevens et al.

[11] Patent Number: 6,164,695
[45] Date of Patent: Dec. 26, 2000

[54] INFLATOR

[75] Inventors: Halley O. Stevens; Thomas H. Deming; Jon J. Freesmeier, all of Mesa, Ariz.

[73] Assignee: TRW Inc., Lundhurst, Ohio

[21] Appl. No.: 09/327,584

[22] Filed: Jun. 8, 1999

[51] Int. Cl.$^7$ .................................................. B60R 21/26
[52] U.S. Cl. ......................................... 280/737; 280/741
[58] Field of Search .................................. 280/737, 736, 280/741

[56] References Cited

U.S. PATENT DOCUMENTS

| | | | |
|---|---|---|---|
| 3,961,806 | 6/1976 | Katter | 280/737 |
| 5,630,619 | 5/1997 | Buchanan et al. | 280/737 |
| 5,794,973 | 8/1998 | O'Loughlin et al. | 280/737 |
| 5,884,938 | 3/1999 | Rink et al. | 280/737 |
| 6,086,094 | 7/2000 | Stevens et al. | 280/741 |

*Primary Examiner*—Peter C. English
*Attorney, Agent, or Firm*—Tarolli, Sundheim, Covell, Tummino & Szabo L.L.P.

[57] ABSTRACT

An inflator (10) for providing inflation fluid to inflate an inflatable device includes a container (12) containing a stored pressurized gas. The container (12) has a primary chamber (24) and a secondary chamber (26). The container (12) has a wall (32) separating the primary and secondary chambers (24, 26). An orifice (34) communicates the primary chamber (24) with the secondary chamber (26). The container (12) has an outlet passage (42) communicating with the secondary chamber (26). The flow area of the outlet passage (42) is greater than the flow area of the orifice (34). A member (46) has a first condition blocking flow through the outlet passage (42) and a second condition permitting flow through the outlet passage. An initiator (52) causes the member (46) to assume the second condition so as to permit flow from the secondary chamber (26) through the outlet passage (42) and create a pressure differential between the primary and secondary chambers (24, 26) acting on the wall (32). The pressure differential ruptures the wall (32).

7 Claims, 1 Drawing Sheet

INFLATOR

FIELD OF THE INVENTION

The present invention relates to an inflator for providing inflation fluid to inflate an inflatable device.

BACKGROUND OF THE INVENTION

An inflator for providing inflation fluid to inflate an inflatable device, such as an air bag, typically includes a container containing a stored pressurized gas. A rupturable closure member is fixed to the container to block flow of inflation fluid through an outlet passage. An initiator located next to the closure member, when actuated, causes the closure member to rupture so that inflation fluid can flow from the inflator. Also, a projectile or other piercing device may be used for opening the closure member.

SUMMARY OF THE INVENTION

The present invention is an inflator for providing inflation fluid to inflate an inflatable device. The inflator includes a container containing a stored pressurized gas. The container has a primary chamber and a secondary chamber. The container has a wall separating the primary and secondary chambers. An orifice communicates the primary chamber with the secondary chamber. The container has an outlet passage communicating with the secondary chamber. The flow area of the outlet passage is greater than the flow area of the orifice.

A member has a first condition blocking flow through the outlet passage and a second condition permitting flow through the outlet passage. An initiator causes the member to assume the second condition so as to permit flow from the secondary chamber through the outlet passage and create a pressure differential between the primary and secondary chambers acting on the wall. The pressure differential ruptures the wall.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
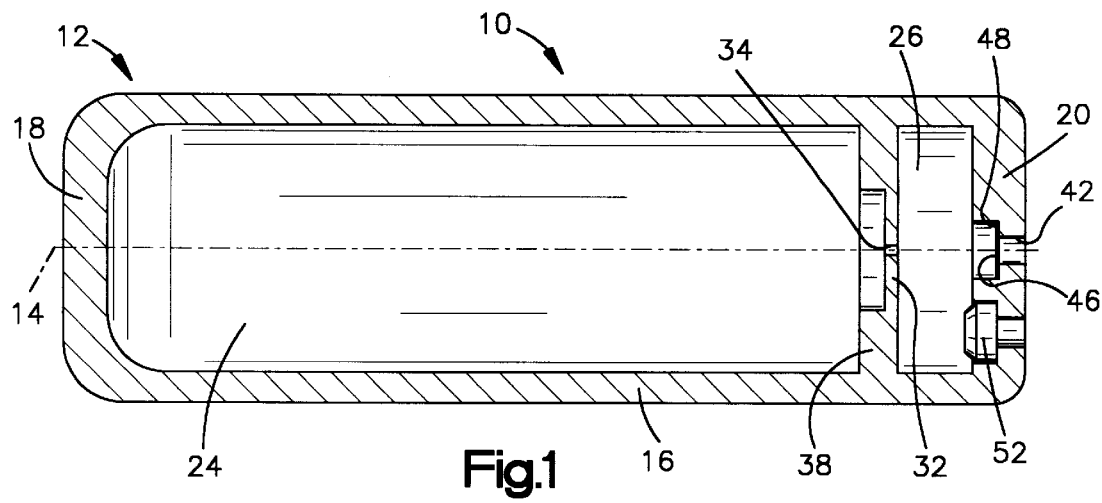
FIG. 1 is a schematic sectional view of an inflator embodying the present invention.

The present invention relates to an inflator for providing inflation fluid to inflate an inflatable device, such as an air bag of an inflatable vehicle occupant protection device. As representative of the present invention, FIG. 1 illustrates schematically an inflator 10 for providing inflation fluid to inflate an inflatable device (not shown).

The inflator 10 has a cylindrical container 12 with a longitudinal central axis 14. The cylindrical container 12 includes a cylindrical outer wall 16 and opposite end walls 18 and 20. The container 12 has a primary chamber 24 and a secondary chamber 26 which contain pressurized gas.

The pressurized gas stored in the chambers 24 and 26 preferably consists essentially of helium at a storage pressure within the range of about 4,000 psi to about 7,000 psi. The pressurized gas may, however, have any other composition and storage pressure suitable for inflating an inflatable device.

A wall 32 separates the primary chamber 24 from the secondary chamber 26. The wall 32 extends transverse to the longitudinal axis 14 of the container 12. An orifice 34 extends through the wall 32 and is centered on the axis 14. The orifice 34 communicates the primary chamber 24 with the secondary chamber 26.

A ring-shaped wall structure 38 connects the wall 32 to the outer cylindrical wall 16. The wall structure 38 has a thickness measured along the axis 14. The thickness of the wall structure 38 is constant throughout the radial extent of the wall structure.

The wall 32 has a thickness measured along the axis 14. The thickness of the wall 32 is constant throughout the radial extent of the wall. The thickness of the wall 32 is smaller than the thickness of the wall structure 38.

An outlet passage 42 extends through the end wall 20 and communicates with the secondary chamber 26. The outlet passage 42 is centered on the axis 14 of the container 12. The flow area of the outlet passage 42 is greater than the flow area of the orifice 34.

A closure member or burst disk 46 is fixed to a shoulder 48 of the end wall 20. The closure member 46 may be connected to the end wall 20 in any manner well known in the art, such as by brazing, projection welding, electron beam welding or laser welding. The closure member 46 has a first condition, shown in FIG. 1, in which the closure member blocks flow through the outlet passage 42. The closure member 46 has a second, ruptured condition, shown in FIG. 2, permitting flow through the outlet passage 42.

An initiator 52 is fixedly connected to the end wall 20. The initiator 52 extends into the secondary chamber 26. When actuated, the initiator 52 causes the closure member 46 to assume the second, ruptured condition shown in FIG. 2. The closure member 46 permits flow through the outlet passage 42 when ruptured.

Figure 2:
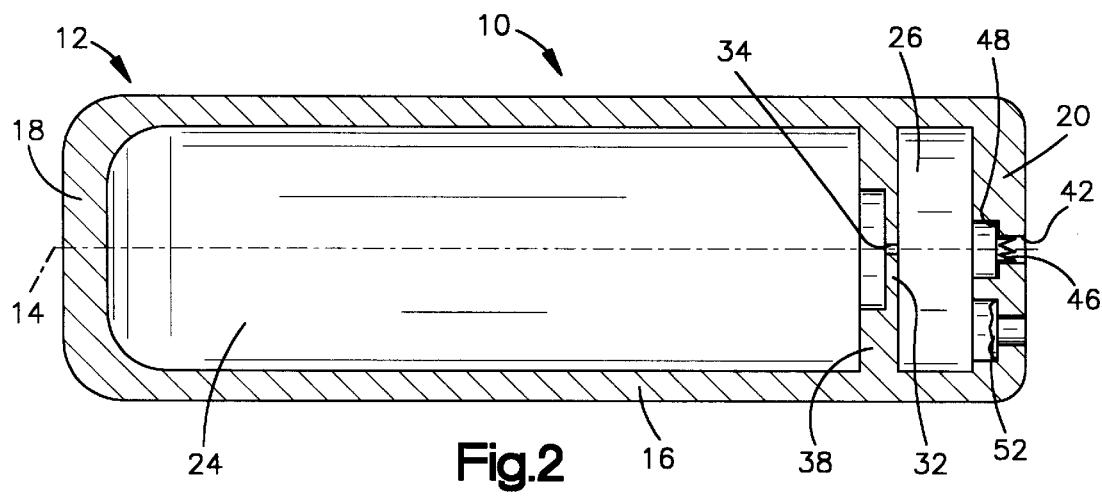
FIG. 2 is a schematic sectional view of the inflator of FIG. 1 showing a closure member of the inflator in a ruptured condition.

Upon actuation of the initiator 52, the pressure in the secondary chamber 26 rapidly rises to a level sufficient to cause the closure member 46 to rupture or assume the second, ruptured condition shown in FIG. 2. The pressure in the primary chamber 24 is not effected to any great extent due to the restricted gas flow through the orifice 34.

Figure 3:
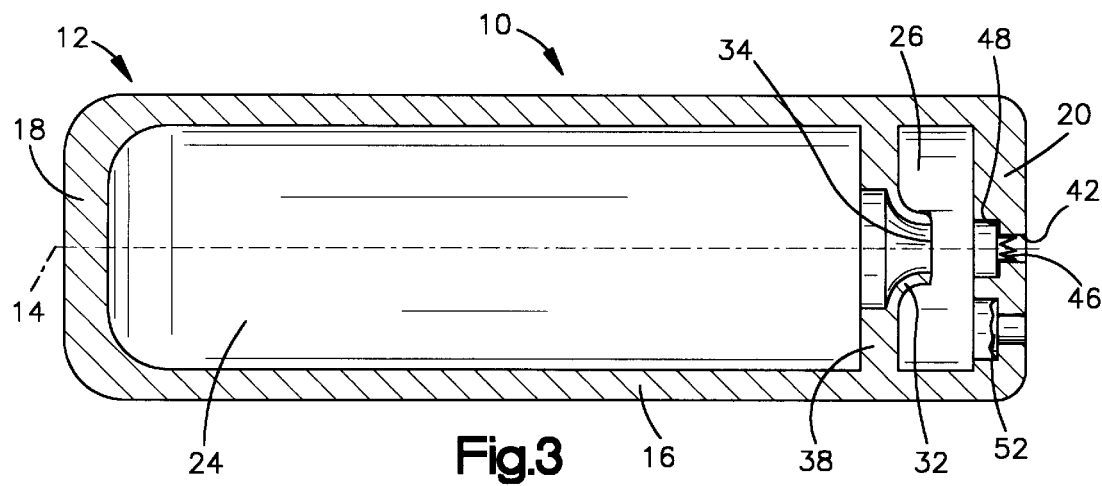
FIG. 3 is a schematic sectional view of the inflator of FIG. 2 showing a wall of the inflator in a ruptured condition.

Once the closure member 46 ruptures, a pressure differential between the primary chamber 24 and the secondary chamber 26 is created due to the flow of gas through the outlet passage 42. The pressure in the secondary chamber 26 drops to a level low enough that the wall 32 separating the primary chamber 24 from the secondary chamber 26 is ruptured and deformed to the condition shown in FIG. 3. When the wall 32 is ruptured, the flow area of the orifice 34 increases to permit the flow of gas from the primary chamber through the outlet passage 42.

From the above description of the invention, those skilled in the art will perceive improvements, changes and modifications. Such improvements, changes and modifications within the skill of the art are intended to be covered by the appended claims.

Having described the invention, the following is claimed:

1. An inflator for providing inflation fluid to inflate an inflatable device, said inflator comprising:

a container containing a stored pressurized gas;

said container having a primary chamber and a secondary chamber;

said container having a wall separating said primary and secondary chambers and an orifice communicating said primary and secondary chambers;

said container having an outlet passage communicating with said secondary chamber, the flow area of said outlet passage being greater than the flow area of said orifice;

a member having a first condition blocking flow through said outlet passage and a second condition permitting flow through said outlet passage;

an initiator causes said member to assume said second condition so as to permit flow from said secondary chamber through said outlet passage and to create a pressure differential between said primary and secondary chambers acting on said wall which pressure differential ruptures said wall.

2. An inflator as defined in claim 1 wherein said member comprises a burst disk which blocks fluid flow through said outlet passage in said first condition.

3. An inflator as defined in claim 2 wherein said burst disk is ruptured when in said second condition.

4. An inflator as defined in claim 1 wherein said orifice is in said wall and said container has a central axis, said orifice, said wall, said burst disk and said outlet passage being centered on said axis.

5. An inflator as defined in claim 4 wherein said container has an outer cylindrical wall centered on said axis and said wall extents transverse to said axis.

6. An inflator as defined in claim 4 wherein said container has a ring-shaped wall structure connecting said wall to said outer cylindrical wall, said wall structure having a first thickness measured along said axis greater than a second thickness of said wall measured along said axis at the location where said wall and wall structure are interconnected.

7. An inflator as defined in claim 6 wherein said wall structure has a constant first thickness throughout its radial extent and said wall has a constant second thickness throughout its radial extent.

* * * * *